(12) United States Patent
Henry

(10) Patent No.: US 12,527,240 B2
(45) Date of Patent: Jan. 20, 2026

(54) SYSTEMS FOR DISC BLADE DEFORMATION DETECTION

(71) Applicant: CNH Industrial Canada, Ltd., Saskatoon (CA)

(72) Inventor: James Wayne Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 273 days.

(21) Appl. No.: 18/120,056

(22) Filed: Mar. 10, 2023

(65) Prior Publication Data

US 2024/0298561 A1  Sep. 12, 2024

(51) Int. Cl.
*A01B 61/00* (2006.01)
*A01C 5/06* (2006.01)
*G01B 11/16* (2006.01)

(52) U.S. Cl.
CPC .............. *A01B 61/00* (2013.01); *A01C 5/064* (2013.01); *G01B 11/167* (2013.01)

(58) Field of Classification Search
CPC ........ A01B 61/00; A01C 5/064; G01B 11/167
USPC ........................................................... 356/32
See application file for complete search history.

(56) References Cited

U.S. PATENT DOCUMENTS

| | | | |
|---|---|---|---|
| 8,434,563 B2 | 5/2013 | Gendelman et al. | |
| 11,122,731 B2 | 9/2021 | Hubner et al. | |
| 2003/0082995 A1* | 5/2003 | Cohen | B28D 5/022 451/6 |
| 2011/0090514 A1* | 4/2011 | Robinson | F01D 25/285 356/601 |
| 2020/0340215 A1 | 10/2020 | Harnetiaux | |
| 2020/0390024 A1 | 12/2020 | Naylor et al. | |
| 2023/0160834 A1* | 5/2023 | Lincoln | G01M 11/081 356/430 |

FOREIGN PATENT DOCUMENTS

| | | | |
|---|---|---|---|
| CN | 112240742 A | | 1/2021 |
| JP | 2019103431 A | * | 6/2019 |
| JP | 7013005 B2 | | 1/2022 |

OTHER PUBLICATIONS

U.S. Appl. No. 18/323,923, filed May 25, 2023, Christopher R. Barrick.

\* cited by examiner

*Primary Examiner* — Sunghee Y Gray
(74) *Attorney, Agent, or Firm* — Fletcher Yoder, P.C.

(57) ABSTRACT

A control system for a tillage implement includes an emitter configured to direct a beam across a set of disc blades of the tillage implement. An axis of the beam is configured to intersect the set of disc blades at a first position radially offset from a rotational axis of the set of disc blades. The control system also includes a sensor configured to receive the beam associated with the emitter. The control system also includes a controller including a memory configured to store instructions and one or more processors. The controller is configured to receive a signal from the sensor indicative of detection of the beam. The controller is also configured to determine a wear status of the set of disc blades based on the signal.

6 Claims, 4 Drawing Sheets

SYSTEMS FOR DISC BLADE DEFORMATION DETECTION

BACKGROUND

The present disclosure relates to a disc blade deformation detection system.

Certain agricultural implements include ground engaging tools configured to interact with soil. For example, a tillage implement may include disc blades configured to break up the soil for subsequent planting or seeding operations. Groups of disc blades may be arranged in gangs, and each gang of disc blades may be rotatably coupled to a frame of the tillage implement. Over time, the disc blades may wear or deform (e.g., bulge) due to repeated contact with the soil and objects deposited within the soil. Unfortunately, manual inspection of multiple disc blades may be imprecise and time-consuming.

BRIEF DESCRIPTION

In certain embodiments, a control system for a tillage implement includes an emitter configured to direct a beam across a set of disc blades of the tillage implement. An axis of the beam is configured to intersect the set of disc blades at a first position radially offset from a rotational axis of the set of disc blades. The control system also includes a sensor configured to receive the beam associated with the emitter. The control system also includes a controller including a memory configured to store instructions and one or more processors. The controller is configured to receive a signal from the sensor indicative of detection of the beam. The controller is also configured to determine a wear status of the set of disc blades based on the signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming involves tilling the soil of a field prior to planting seeds. Typically, tillage of soil is accomplished via a work vehicle (e.g., tractor) towing a tillage implement across the field. The tillage implement may be equipped with several disc blades (e.g., discs) which engage the soil while being pulled across the field, thereby tilling (e.g., plowing) the soil. The tillage implement and/or the work vehicle may be at least partially automated so as to till soil at least partially independently of human control. During the tilling process, the disc blades of the tillage implement may deform (e.g., wear, bulge) over time as a result of prolonged contact (e.g., friction) with the soil and obstructions (e.g., rocks, etc.) within the soil. Accordingly, in certain embodiments disclosed herein, the tillage implement may be outfitted with a disc blade deformation detection system. The disc blade deformation detection system may use one or more sensors to determine a status of the disc blades (e.g., wearing and/or bulging of the disc blades). In certain embodiments, at least one emitter may be configured to direct at least one beam across a set of disc blades (e.g., gang of disc blades). At least one sensor may be configured to receive the at least one beam in response to a decrease in the radius of the disc blades due to wear. In response to the at least one sensor receiving the at least one beam, the at least one sensor may output a signal to a controller. The controller may then determine the status of the set of disc blades (e.g., wear status) based on the signal.

Figure 1:
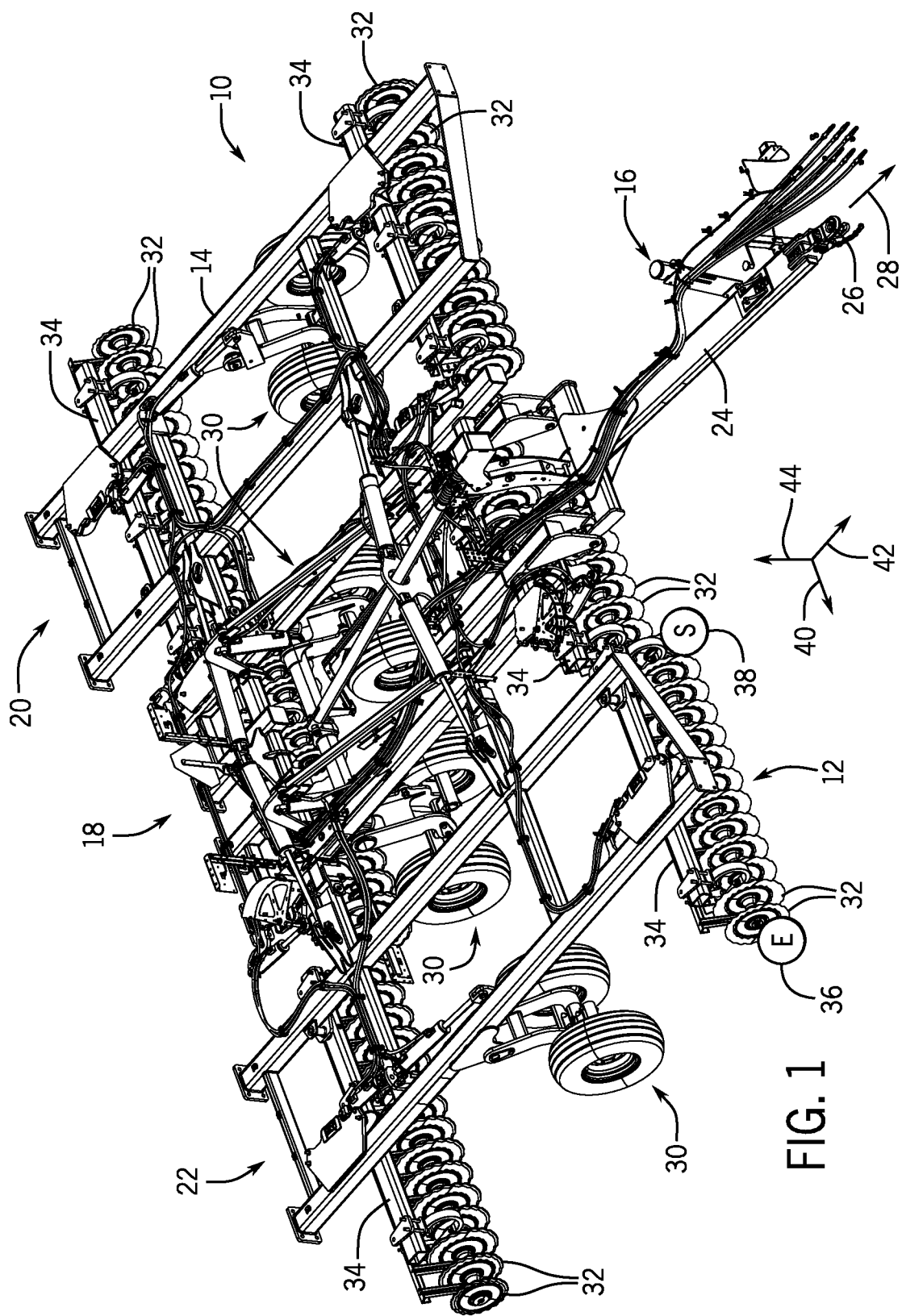
FIG. 1 is a perspective view of an embodiment of a tillage implement having a disc blade deformation detection system.

With the foregoing in mind, FIG. 1 is a perspective view of an embodiment of a tillage implement 10 having a disc blade deformation detection system 12. In the illustrated embodiment, the tillage implement 10 is a vertical tillage implement having multiple ground engaging tools configured to till soil. As illustrated, the tillage implement 10 includes a frame 14 and a hitch assembly 16 coupled to the frame 14. In the illustrated embodiment, the frame 14 includes a center section 18, a left wing section 20, and a right wing section 22. Each wing section is configured to rotate upwardly from the illustrated working position to a transport position to facilitate transport of the tillage implement 10. For example, one or more actuators (e.g., hydraulic cylinder(s), etc.) may be configured to drive each wing section to rotate between the illustrated working position and the transport position. While the frame 14 includes the center section 18, the left wing section 20, and the right wing section 22 in the illustrated embodiment, in other embodiments, the frame may include more or fewer sections. For example, in certain embodiments, the frame may be substantially rigid (e.g., not including any translatable and/or rotatable components). Furthermore, the frame 14 may be formed from multiple frame elements (e.g., rails, tubes, braces, etc.) coupled to one another (e.g., via welded connection(s), via fastener(s), etc.).

In the illustrated embodiment, the hitch assembly 16 includes a hitch frame 24 and a hitch 26. The hitch frame 24 is pivotally coupled to the implement frame 14 via pivot joint(s), and the hitch 26 is configured to couple to a corresponding hitch of a work vehicle (e.g., tractor), which is configured to tow the tillage implement 10 through a field along a direction of travel 28. While the hitch frame 24 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis relative to the implement frame, or the hitch frame may be rigidly coupled to the implement frame.

As illustrated, the tillage implement 10 includes wheel assemblies 30 movably coupled to the implement frame 14. In the illustrated embodiment, each wheel assembly 30 includes a wheel frame and a wheel rotatably coupled to the wheel frame. The wheels of the wheel assemblies 30 are configured to engage the surface of the soil, and the wheel assemblies 30 are configured to support at least a portion of the weight of the tillage implement 10. In the illustrated embodiment, each wheel frame is pivotally coupled to the implement frame 14, thereby facilitating adjustment of the vertical position of the respective wheel(s). However, in other embodiments, at least one wheel frame may be movably coupled to the implement frame by another suitable connection (e.g., sliding connection, linkage assembly, etc.) that facilitates adjustment of the vertical position of the respective wheel(s).

In the illustrated embodiment, the tillage implement 10 includes disc blades 32 configured to engage a top layer of the soil. As the tillage implement 10 is towed through the field, the disc blades 32 are driven to rotate, thereby breaking up the top layer of the soil. In the illustrated embodiment, the disc blades 32 are arranged in two rows. However, in other embodiments, the disc blades may be arranged in more or fewer rows (e.g., 1, 3, 4, 5, 6, or more). Furthermore, in the illustrated embodiment, each row of disc blades 32 includes four gangs of disc blades 32. Two gangs of disc blades of the front row are coupled to the center section 18, two gangs of disc blades of the rear row are coupled to the center section 18, one gang of disc blades of the front row is coupled to the left wing section 20, one gang of disc blades of the rear row is coupled to the left wing section 20, one gang of disc blades of the front row is coupled to the right wing section 22, and one gang of disc blades of the rear row is coupled to the right wing section 22. While the tillage implement 10 includes eight gangs of disc blades 32 in the illustrated embodiment, in other embodiments, the tillage implement may include more or fewer gangs of disc blades (e.g., 2, 4, 6, 10, or more). Furthermore, the gangs of disc blades may be arranged in any suitable configuration on the implement frame.

The disc blades 32 of each gang are non-rotatably coupled to one another by a respective shaft, such that the disc blades 32 of each gang rotate together. The disc blades 32 may include plain disc blade(s), notched disc blade(s), fluted disc blade(s), or a combination thereof. Each shaft is rotatably coupled to a respective disc blade support 34, which is configured to support the gang, including the shaft and the disc blades 32. The disc blades 32 supported by each disc blade support 34 share a common rotational axis, such that the disc blades 32 sharing the common rotational axis form a set of disc blades 32. In certain embodiments, the set of disc blades 32 may include one or more disc blades 32. Furthermore, each disc blade support 34 is pivotally coupled to the frame 14 at a respective pivot point, thereby enabling the disc blade support 34 to rotate relative to the frame 14. Rotating the disc blade support 34 relative to the frame 14 controls the angle between the respective disc blades 32 and the direction of travel 28, thereby controlling the interaction of the disc blades 32 with the top layer of the soil. Each disc blade support 34 may include any suitable structure(s) configured to support the respective gang (e.g., including a square tube, a round tube, a bar, a truss, other suitable structure(s), or a combination thereof). While the disc blades 32 supported by each disc blade support 34 are arranged in a respective gang (e.g., non-rotatably coupled to one another by a respective shaft) in the illustrated embodiment, in other embodiments, at least a portion of the disc blades supported by at least one disc blade support (e.g., all of the disc blades supported by the disc blade support) may be arranged in another suitable configuration (e.g., individually mounted and independently rotatable, mounted in groups and individually rotatable, etc.). For example, in certain embodiments, a first portion of the disc blades supported by a disc blade support may be arranged in a gang, and a second portion of the disc blades supported by the disc blade support may be individually mounted and independently rotatable. In some embodiments, the angle of a least some of the disc blades 32 (e.g., all of the disc blades 32) may be fixed relative to the direction of travel of the tillage implement 10.

In the illustrated embodiment, the disc blade deformation detection system includes an emitter 36 (e.g., laser emitter, diode, etc.) and a sensor 38 (e.g., detector, receiver, transducer, etc.), and the emitter 36 and the sensor 38 are each coupled to a locality proximate to the disc blades 32. For example, the emitter 36 and/or sensor 38 may be coupled to the frame 14, a disc blade support 34, or some other structure located near the disc blades 32. The emitter 36 is positioned on one lateral side (e.g., with respect to the lateral direction 40) of the set of disc blades 32 (e.g., a gang of disc blades 32) and emits a beam (e.g., laser beam, light beam) across the disc blades 32, such that an axis of the beam intersects one or more of the disc blades 32. The sensor 38 may be aligned with the axis of the beam and configured to detect the beam to facilitate determination of a wear status (e.g., reduction of diameter) of the disc blades 32. More description of the emitter 36 and sensor 38 is provided with regard to the embodiments discussed in FIGS. 2-4 below.

Figure 2:
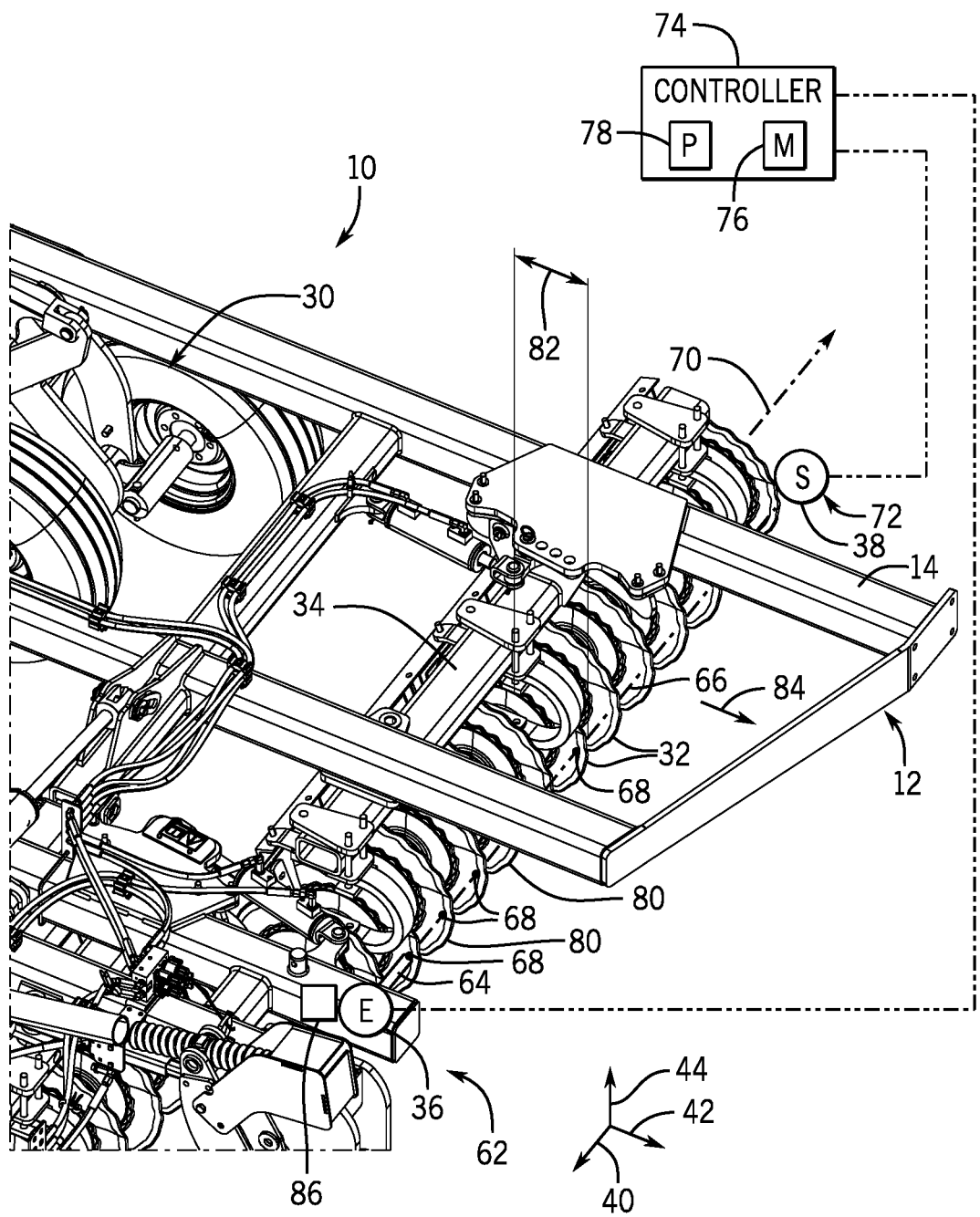
FIG. 2 is a perspective view of an embodiment of the disc blade deformation detection system that may be employed within the tillage implement of FIG. 1.

FIG. 2 is a perspective view of an embodiment of the disc blade deformation detection system 12 that may be employed within the tillage implement 10 of FIG. 1. The disc blade deformation detection system 12 includes an emitter 36 (e.g., laser emitter, diode, etc.). The emitter 36 may be coupled to the frame 14, the disc blade support 34, or any other suitable support (e.g., in the proximity of the disc blades 32). In the illustrated embodiment, the emitter 36 is mounted on a first lateral side 62 (e.g., with respect to the lateral direction 40) of the set of disc blades 32 (e.g., gang of disc blades 32). In this manner, the emitter 36 is configured to direct a beam 64 across the set of disc blades 32 of the tillage implement 10, such that an axis 66 of the beam 64 intersects one or more of the disc blades 32 at a position 68 radially offset from a rotational axis 70 of the disc blades 32. The disc blade deformation detection system 12 also includes a sensor 38 (e.g., detector, receiver, transducer, etc.) configured to detect the beam 64. In the illustrated embodiment, the sensor 38 is mounted on a second lateral side 72 (e.g., with respect to the lateral direction 40) of the set of disc blades 32, opposite the first lateral side 62. The emitter 36 and/or sensor 38 may be mounted directly to the tillage implement 10 or, in certain embodiments, using mounting/attachment hardware. In some embodiments, the emitter 36 and/or sensor 38 may be positioned to monitor additional sets of disc blades 32.

In the illustrated embodiment, the disc blade deformation detection system 12 includes a controller 74 communicatively coupled to the sensor 38 and configured to receive a signal (e.g., sensor data) from the sensor 38 indicative of wear of the set of disc blades 32 (e.g., round blades, non-notched blades). The controller 74 is also configured to determine a wear status (e.g., reduction of diameter) of the set of disc blades 32 based on the signal. The controller 40 includes a memory 76 and a processor 78 (e.g., a microprocessor). In certain embodiments, the controller 74 is also communicatively coupled to the emitter 36 and configured to control operation of the emitter (e.g., turn emitter on/off, adjust emitter setting(s), etc.). Moreover, the processor 78 may include multiple microprocessors, one or more "general-purpose" microprocessors, one or more special-purpose microprocessors, and/or one or more application specific integrated circuits (ASICS), or some combination thereof. For example, the processor 78 may include one or more reduced instruction set (RISC) or complex instruction set (CISC) processors. The memory 76 may include a volatile memory, such as random access memory (RAM), and/or a nonvolatile memory, such as read-only memory (ROM). The memory 76 may store a variety of information and may be used for various purposes. For example, the memory 76 may store processor-executable instructions (e.g., firmware or software) for the processor 78 to execute, such as instructions for controlling the emitter. The memory 76 and/or the processor 78, or an additional memory and/or processor, may be located in any suitable portion of the tillage implement 10 or, in some embodiments, a work vehicle towing the tillage implement 10.

In certain embodiments, the axis 66 of the beam 64 is substantially parallel to the rotational axis 66 of the set of disc blades 32 (e.g., an angle between the axis of the beam and the rotational axis is less than 5 degrees, less than 4 degrees, less than 3 degrees, less than 2 degrees, less than 1 degree, or less than 0.5 degrees). Accordingly, the position 68 at which the beam 64 intersects the set of disc blades 32 corresponds to a radial distance away from the rotational axis 66 of the set of disc blades 32. Furthermore, in certain embodiments, the position 68 may be located proximate to an outer edge 80 (e.g., circumference) of the disc blades 32. For example, the position 68 may be located less than 1 cm, 2 cm, 4 cm, or 6 cm inward of the outer edge 80 of the disc blades 32.

In certain embodiments, the beam 64 emitted by the emitter 36 may be obstructed by one or more of the disc blades 32, such that the beam is unable to be sensed (e.g., detected) by the sensor 38. In response to radii 82 of the set of disc blades 32 being worn past a threshold radius, the beam 64 may become unobstructed and thereby detected by the sensor 38. For example, the beam 64 may be offset from the rotational axis 66 by 16 inches (40.64 cm), such that a wear amount (e.g., radial wear) of 2 inches (5.08 cm) of a disc with a radius of 18 inches (45.72 cm) may result in the beam 64 becoming unobstructed. In response to the sensor 38 detecting the beam 64 emitted by the emitter 36, the controller 74 may receive a signal from the sensor 38 indicative of the beam 64 being detected by the sensor 38. For example, the controller 74 may receive a high voltage (e.g., 12V) from the sensor 38 when the sensor 38 detects the beam 64, and a low voltage (e.g., 0V) when the beam 64 is not detected.

In certain embodiments, the emitter 36 may be configured to emit the beam 64 across each disc blade of the set of disc blades 32, such that the signal sent by the sensor 38 to the controller 74 is indicative of the wearing of the least-worn disc blade of the disc blades 32. That is, the disc blade 32 with the largest radius 82 (e.g., least-worn disc blade 32) may obstruct the beam 64 until the radius 82 of the disc blade 32 is worn past a threshold radius.

In certain embodiments, the set of disc blades 32 may be subdivided into sections, such that an emitter/sensor pair (e.g., comprising an emitter and sensor) is used to monitor the wearing of the disc blades 32 of each section. For example, a first emitter/sensor pair may monitor a first section of the set of disc blades 32. A first emitter of the emitter/sensor pair may emit a first beam across the first section of disc blades 32, such that the first beam is obstructed by the disc blades 32 of the first section. In response to a radius of the disc blades 32 in the first section being worn past a threshold radius, the first beam may become unobstructed, thereby triggering the first sensor to output a signal to the controller 74. Similarly, a second emitter of a second emitter/sensor pair may emit a second beam across a second section of disc blades 32, such that the second beam is obstructed by the disc blades 32 of the second section. In response to a radius of the disc blades 32 in the second section being worn past a threshold radius, the second beam may become unobstructed, thereby triggering the second sensor to output a signal to the controller 74. By subdividing the set of disc blades 32 into sections, the first and second sensors may also provide the controller 74 with the additional information of the section of disc blades 32 that has undergone the most wear.

In certain embodiments, the radial offset of the axis 66 of the beam 64 relative to the rotational axis 66 is adjustable. For example, the emitter 36 and the sensor 38 may be configured to be moved in a radial direction 84 relative to the disc blades 32, via a beam offset adjustment mechanism 86, so as to adjust the threshold amount of wear (e.g., threshold radius) of the set of disc blades 32 sufficient for the beam 64 to be unobstructed from reaching the sensor 38. The emitter 36 and the sensor 38 may be configured to be moved manually or, in some embodiments, via actuator(s). In some embodiments, the emitter 36 and the sensor 38 may be configured to be moved together, so as to maintain a positional relationship. An adjustable emitter 36 and sensor 38 may enable a user to adjust the threshold amount of wear based on one or more factors (e.g., an angle of the set of disc blades 32, user preferences, characteristics of the disc blades 32, etc.).

In certain embodiments, the controller 74 may be configured to receive a signal from the sensor 38 indicative of wearing of at least one notched disc blade of the set of disc blades 32. The controller 74 may also be configured to determine a wear status of the at least one notched disc blade. For example, the controller 74 may be configured to determine that the notched disc blade is not worn based on a periodic signal received from the sensor 38 due to the beam 64 being periodically blocked by the notches of the notched disc blade. The controller 74 may also be configured to determine that the notched disc blade is worn based on a continuous signal received form the sensor 38 due to the beam 64 being continuously detected by the sensor 38 (e.g., due to wearing of the notches).

In certain embodiments, the emitter 36 and the sensor 38 are positioned such that the axis of the beam 64 emitted by the emitter 36 is positioned radially outward from the outer circumference of the disc blades 32. The controller 74 may be configured to receive a signal from the sensor 38 indicative of bulging of at least one disc blade of the set of disc blades 32. The controller 74 may also be configured to determine a bulge status of at least one disc blade of the set of disc blades 32 based on the signal. For example, as a disc blade 32 deforms (e.g., becomes elliptical, becomes oblong), an intersection of a major axis of the elongated disc blade 32 may extend past the circumference of the non-deformed disc blades 32. As a result of the elongation of the disc blade 32, the disc blade 32 may obstruct the beam 64 (e.g., the axis of which is offset radially outward from the radius of the non-deformed disc blade 32). In certain embodiments, the emitter 36 may be configured to emit the beam 64 across each disc blade of the set of disc blades 32, such that the signal received by the controller 74 from the sensor 38 is indicative of bulging of one or more disc blades 32 of the set.

In some embodiments, the controller 74 may be configured to monitor variations in the signal(s) to determine an amount of deformation. For example, an elongated disc blade 32 may obstruct a sensor for only a partial revolution. As the deformation of the disc blade 32 increases, the duration of beam blockage per revolution increases due to the sensor being obstructed for a larger proportion of the revolution of the disc blade 32. Furthermore, in some embodiments, more than two sensors 38 (e.g., and corresponding emitters 36) may be used. For example, the controller 74 may be configured to receive multiple signals from more than three sensors 38, four sensors 38, six sensors 38, or eight sensors 38 to determine an amount of bulging of the disc blades 32 as described above.

Figure 3:
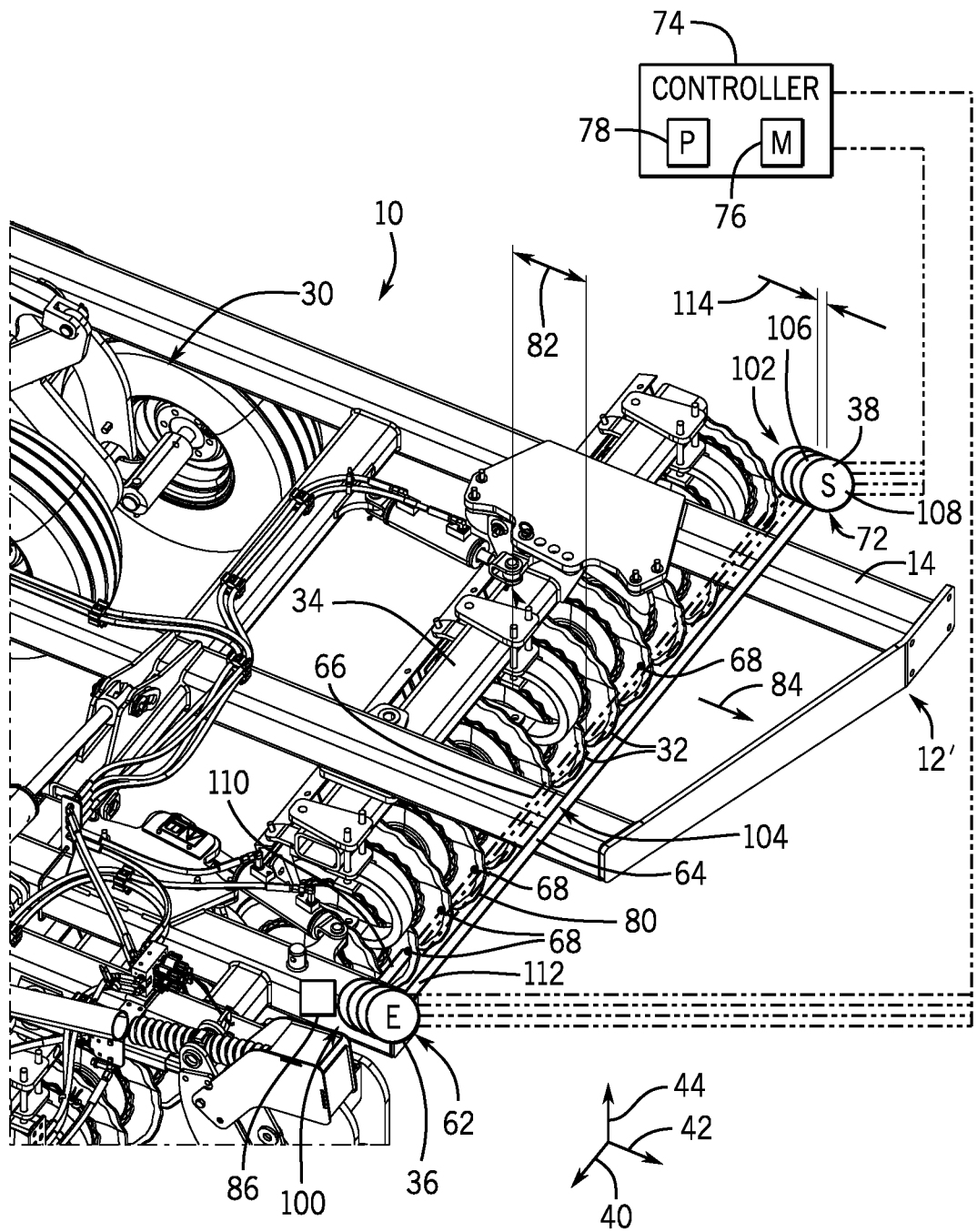
FIG. 3 is a perspective view of a second embodiment of the disc blade deformation detection system that may be employed within the tillage implement of FIG. 1.

FIG. 3 is a perspective view of a second embodiment of the disc blade deformation detection system 12' that may be employed within the tillage implement 10 of FIG. 1. The disc blade deformation detection system 12' includes one or more emitters 36 (e.g., laser emitter, diode, etc.). The one or more emitters 36 may be coupled to the frame 14, the disc blade support 34, or any other suitable support (e.g., in the proximity of the disc blades 32). In the illustrated embodiment, the one or more emitters 36 are mounted on a first lateral side 62 (e.g., with respect to the lateral direction 40) of the set of disc blades 32 (e.g., gang of disc blades 32). In this manner, the one or more emitters 36 are configured to direct one or more beams 64 across the set of disc blades 32 of the tillage implement 10, such that at least one of one or more axes 66 of the one or more beams 64 intersects the set of the disc blades 32 at one or more positions 68 radially offset from a rotational axis 70 of the disc blades 32. The disc blade deformation detection system 12' also includes one or more sensors 38 (e.g., detectors, receivers, transducers, etc.) configured to detect the one or more beams 64. In the illustrated embodiment, the one or more sensors 38 are mounted on a lateral side 72 (e.g., with respect to the lateral direction 40) of the set of disc blades 32 (e.g., gang of disc blades 32), opposite the first lateral side 62. The one or more emitters 36 and/or the one or more sensors 38 may be mounted directly to the tillage implement 10 or, in certain embodiments, using mounting/attachment hardware. Additionally or alternatively, the one or more emitters 36 and one or more sensors 38 may be used with other sets of disc blades 32.

In the illustrated embodiment, the disc blade deformation detection system 12' includes a controller 74 communicatively coupled to the one or more sensors 38 and configured to receive signal(s) (e.g., sensor data) from the one or more sensors 38 indicative of wear of the set of disc blades 32. The controller 74 is also configured to determine a wear status (e.g., reduction of diameter) of the set of disc blades 32 based on the signal(s). The structure of the controller 74, including the memory 76 and processor 78, corresponds to the structure of the controller 74 disclosed above with reference to FIG. 2.

In certain embodiments, at least one of the beam(s) 64 emitted by the emitter(s) 36 may be obstructed by one or more of the disc blades 32, such that the beam(s) are unable to be sensed (e.g., detected) by the sensor(s) 38. In certain embodiments, one or more axes 66 of the one or more beams 64 may intersect the set of disc blades 32 at one or more positions 68 radially offset from the rotational axis 70 of the set of disc blades 32. In certain embodiments, the axis 66 of the beam 64 is substantially parallel to the rotational axis 66 of the set of disc blades 32 (e.g., an angle between the axis of the beam and the rotational axis is less than 5 degrees, less than 4 degrees, less than 3 degrees, less than 2 degrees, less than 1 degree, or less than 0.5 degrees). Accordingly, the position 68 at which the beam 64 intersects the set of disc blades 32 corresponds to a radial distance away from the rotational axis 66 of the set of disc blades 32.

In response to radii 82 of the set of disc blades 32 being worn past a threshold radius, one or more beams 64 may become unobstructed and thereby be detected by one or more sensors 38. In response to one or more sensors 38 detecting one or more beams 64 emitted by one or more emitters 36, the controller 74 may receive signal(s) from the one or more sensors 38 indicative of the one or more beams 64 being detected by the one or more sensors 38. For example, the controller 74 may receive a high voltage (e.g., 24V) from each sensors 38 when the sensor 38 detects the respective beam 64, and a low voltage (e.g., 0V) when the respective beam 64 is not detected.

In certain embodiments, one or more emitters 36 may be configured to emit one or more beams 64 across each disc blade of the set of disc blades 32, such that the signal(s) received by the controller 74 from the respective sensor(s) 38 are indicative of the wearing of the least-worn disc blade of the disc blades 32. That is, the disc blade 32 with the largest radius 82 (e.g., least-worn disc blade 32) may obstruct at least one of the one or more beams 64 until the radius 82 of the disc blade 32 is worn past a threshold radius.

In the illustrated embodiment, the one or more emitters 36 include an array of emitters 100 (e.g., two emitters, three emitters, four emitters, etc.) arranged along a radial direction 84 of the disc blades 32. Similarly, the one or more sensors 38 include an array of sensors 102 (e.g., two sensors, three sensors, four sensors, etc.) arranged along the radial direction 84 of the blades 32. The array of sensors 102 is configured to detect an array of beams 104 (e.g., two beams, three beams, four beams, etc.) emitted by the array of emitters 100. In certain embodiments, at least one beam 64 of the array of beams 104 may be obstructed by the set of disc blades 32. Concurrently, at least one beam 64 of the array of beams 104 may be unobstructed and detected by respective sensor(s) of the array of sensors 102. For example, at least one beam 64 of the array of beams 104 may be offset a radial distance beyond the radius of unworn disc blades 32, and may thereby be detected by the corresponding sensor(s) 38.

In certain embodiments, the radial offsets of one or more axes 66 of one or more beams 64 of the array of beams 104 relative to the rotational axis 70 are adjustable. For example, the array of emitters 100 and the array of sensors 102 may be configured to be moved in the radial direction 84, via the beam offset adjustment mechanism 86. The array of emitters 100 and the array of sensors 102 may be configured to be moved manually or, in some embodiments, via actuator(s). In some embodiments, the array of emitters 100 and the array of sensors 102 may be configured to be moved together, so as to maintain a positional relationship. An adjustable array of emitters 100 and array of sensors 102 may enable a user to adjust the maximum detectable wear and/or maximum detectable bulge of the disc blades 32 based on one or more factors (e.g., an angle of the set of disc blades 32, user preferences, characteristics of the disc blades 32, etc.).

In certain embodiments, the controller 74 may be configured to receive a first signal at a first time and a second signal at a second time from a first sensor 106 and a second sensor 108, respectively, of the array of sensors 102. The controller 74 may be configured to determine an amount of wear of the set of disc blades 32 based on the first signal and the second signal. For example, at the first time, the controller 74 may receive the first signal from the first sensor 106 of the array of sensors 102 indicative of a first diameter of the disc blades 32 in response to a first beam 110 becoming unobstructed and being sensed by the first sensor 106. At the second time, the controller 74 may receive the second signal from the second sensor 108 (e.g., located radially inward relative to the first sensor 106) in response to a second beam 112 becoming unobstructed and being sensed by the second sensor 108, due to a reduction in diameter of the disc blades 32 from wear. The controller 74 may be configured to determine the amount of wear (e.g., amount by which the diameter of the set of disc blades 32 has decreased) based on a radial spacing 114 between the first sensor 106 and the second sensor 108. In some embodiments, more than two sensors 38 (e.g., and corresponding emitters 36) may be used. For example, the controller 74 may be configured to receive multiple signals over a span of time from more than three sensors 38, four sensors 38, six sensors 38, or eight sensors 38, to determine an amount of wear of the disc blades 32 as described above.

In certain embodiments, the controller 74 may be configured to determine a rate of wear (e.g., rate of diameter reduction) of the set of disc blades 32. For example, the controller 74 may receive, in addition to the aforementioned signals, the timestamps when each of the aforementioned signals were received. The controller 74 may determine the rate of wear based on the aforementioned signals and the timestamps of the aforementioned signals. For example, the controller 74 may be configured to determine the rate of wear by dividing the amount of wear (e.g., radial spacing 114 between the first sensor 106 and the second sensor 108) by the duration of time between the controller 74 receiving the first signal and the second signal.

In certain embodiments, the controller 74 may be configured to receive signal(s) from one or more sensors 38 indicative of bulging of at least one disc blade of the set of disc blades 32. The controller 74 may also be configured to determine a bulge status of at least one disc blade of the set of disc blades 32 based on the signal(s). For example, as a disc blade 32 deforms (e.g., becomes elliptical, becomes oblong), an intersection of a major axis of the elongated disc blade 32 may extend past the circumference of the non-deformed disc blades 32. As a result of the elongation of the disc blade 32, the disc blade 32 may obstruct a beam 64 offset radially beyond a radius of non-deformed (e.g. unworn) disc blades 32. In certain embodiments, one or more emitters 36 may be configured to emit one or more beams 64 across the set of disc blades, such that the signal(s) received by the controller 74 from one or more respective sensors 38 are indicative of the bulging of one or more disc blades 32 of the set.

In certain embodiments, the controller 74 may be configured to receive a first signal from the first sensor 106 at a first time and a second signal from the second sensor 108 at a second time. The controller 74 may be configured to determine an amount of bulging of at least one disc blade of the set of disc blades 32 based on the first signal and the second signal. For example, at a first time, the controller 74 may receive the first signal from the first sensor 106 of the array of sensors 102 indicative of a first diameter of the disc blades 32 in response to the first beam 110 becoming obstructed (e.g., not being sensed by the first sensor 106). At a second time, the controller 74 may receive the second signal from the second sensor 108 (e.g., located radially outward relative to the first sensor 106) in response to the second beam 112 becoming obstructed (e.g., not being sensed by the second sensor 108) due to a radial elongation of at least one disc blade of the set of disc blades 32 (e.g., bulging, deformation, etc.). In certain embodiments, the controller 74 may be configured to determine an amount of bulging (e.g., amount by which the disc blade has radially elongated) based on a radial spacing 114 between the first sensor 106 and the second sensor 108.

In some embodiments, the controller 74 may be configured to monitor variations in the signal(s) to determine an amount of deformation. For example, an elongated disc blade 32 may obstruct a sensor (e.g., the second sensor 108) for only a partial revolution. As the deformation of the disc blade 32 increases, the duration of beam blockage per revolution increases due to the sensor being obstructed for a larger proportion of the revolution of the disc blade 32. Furthermore, in some embodiments, more than two sensors 38 (e.g., and corresponding emitters 36) may be used. For example, the controller 74 may be configured to receive multiple signals from more than three sensors 38, four sensors 38, six sensors 38, or eight sensors 38 to determine an amount of bulging of the disc blades 32 as described above.

In certain embodiments, the controller 74 may be configured to determine a rate of bulging (e.g., rate of deformation) of at least one disc blade of the set of disc blades 32. For example, the controller 74 may be configured to receive, in addition to the aforementioned signals, the timestamps when the aforementioned signals were received. The controller 74 may be configured to determine the rate of bulging based on the aforementioned signals and timestamps of the aforementioned signals. For example, the controller 74 may be configured to determine the rate of bulging by dividing the amount of bulging (e.g., radial spacing 114 between the first sensor 106 and the second sensor 108) by the duration of time between the controller 74 receiving the first signal and the controller 74 receiving the second signal.

In certain embodiments, the emitter/sensor arrays may be positioned to enable the controller 74 to determine the wear of the set of disc blades 32, the bulging (e.g., deformation) of at least one disc blade of the set of disc blades 32, or a combination thereof. Additionally, the controller 74 may be configured to determine a rate of wear of the set of disc blades 32, a rate of bulging of at least one disc blade of the set of disc blades 32, or a combination thereof, based on the first signal, the second signal, and the corresponding timestamps.

Figure 4:
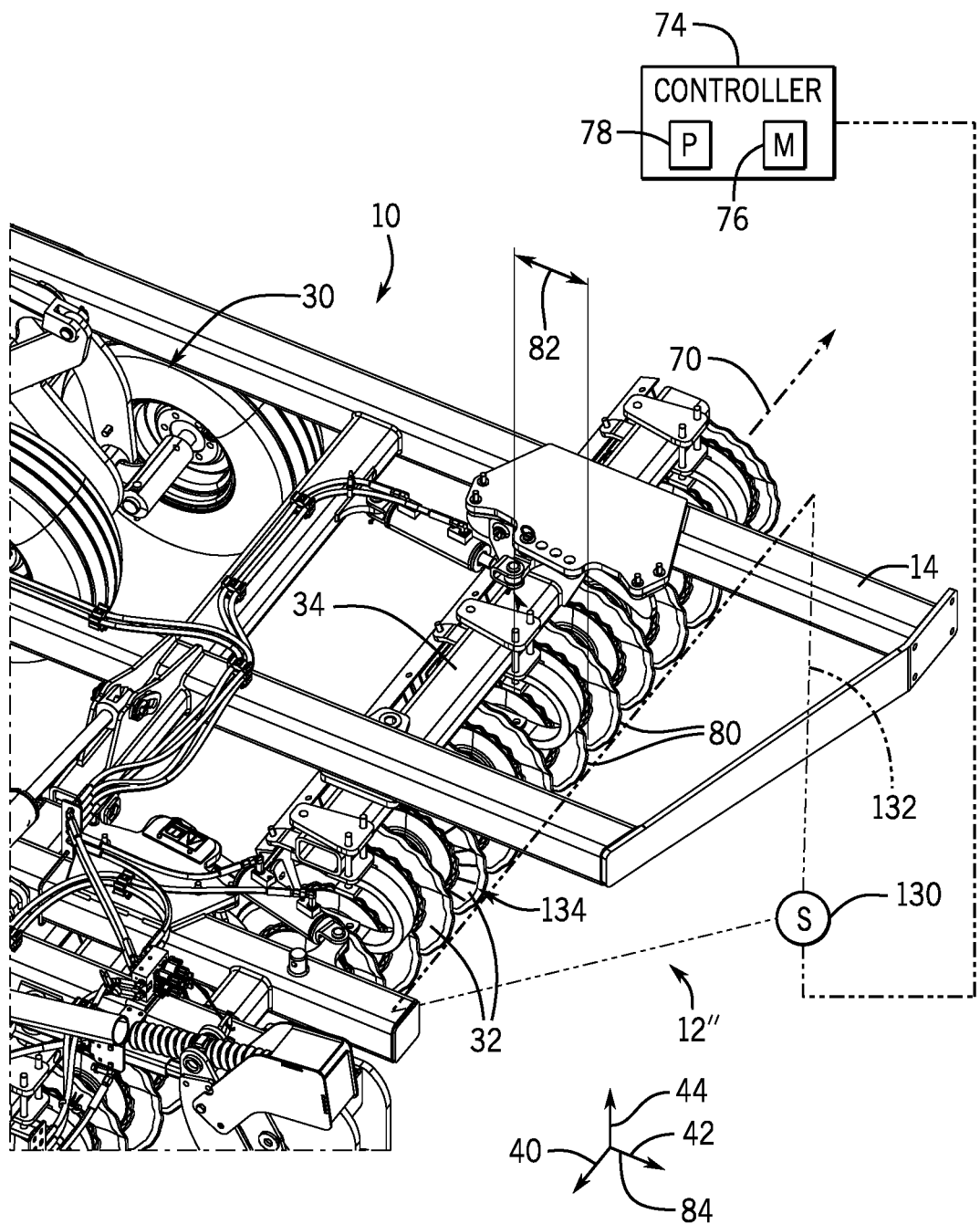
FIG. 4 is a perspective view of a third embodiment of the disc blade deformation detection system that may be employed within the tillage implement of FIG. 1.

FIG. 4 is a perspective view of a third embodiment of the disc blade deformation detection system 12" that may be employed within the tillage implement 10 of FIG. 1. The disc blade deformation detection system 12" includes a lidar sensor 130 (e.g., scanning, solid-state, optical phase array, etc.) configured to direct a field of view 132 at one or more disc blades 32 (e.g., set of disc blades 32, row of disc blades 32, gang of disc blades 32, etc.) of the tillage implement 10. The field of view 132 is configured to intersect one or more outer edges 80 of the one or more disc blades 32. In the illustrated embodiment, the lidar sensor 130 is mounted on the frame 14 of the tillage implement 10 and directed toward the row of disc blades 32 such that the disc blades 32 are within the field of view 132 of the lidar sensor 130.

In the illustrated embodiment, the disc blade deformation detection system 12" includes a controller 74 configured to receive a signal (e.g., sensor data) from the lidar sensor 130 indicative of wear of at least one of the disc blades 32. The controller 74 is also configured to determine a wear status (e.g., condition) of the at least one disc blade 32 based on the signal. The structure of the controller 74, including the memory 76 and processor 78, corresponds to the structure of the controller 74 disclosed above with reference to FIG. 2.

In certain embodiments, the controller 74 may be configured to determine wear of one or more disc blades 32 based on signal(s) received from the lidar sensor 130. For example, the controller 74 may employ machine learning techniques (e.g., segmentation, k-means clustering, neural networks, etc.) to identify and locate the outer edge 80 of each disc blade 32 within the field of view and, in some embodiments, identify and locate the rotational axis 70 of the disc blade 32. In certain embodiments, the controller 74 may employ machine learning techniques to fit a circle and/or arc to the outer edge 80 of the disc blade 32. The controller 74 may determine the wear of the disc blade 32 based on a comparison of multiple radii determined at different times. For example, the controller 74 may determine the wear of the disc blade 32 based on a decrease in the multiple radii from a first time to a second time.

In certain embodiments, the controller 74 may be configured to determine one or more parameters indicative of an amount of wear of the monitored disc blade(s) 32 based on a signal received from the lidar sensor 130. The controller 74 may also be configured to update one or more statuses based on the one or more parameters exceeding one or more threshold values (e.g., adjustable threshold value(s)). For example, the controller 74 may be configured to determine radius/radii of the monitored disc blade(s) 32 based on a signal (e.g., dataset, point cloud, etc.) from the lidar sensor 130. The controller 74 may be configured to update one or more statuses (e.g., database entry/entries, user interface graphic(s), notification(s), etc.) based on the determined radius/radii exceeding a threshold radius (e.g., adjustable threshold radius). In certain embodiments, the controller 74 may be configured to determine the radius of each of the monitored disc blade(s) 32 individually and update a separate status corresponding to each of the monitored disc blade(s) 32.

In certain embodiments, the controller 74 may be configured to determine the radius of a disc blade 32 based on an aggregation of multiple estimates (e.g., using data captured by the lidar sensor 130) of one or more radii 82 along the radial axis 134 of the disc blade 32. For example, the controller 74 may employ machine learning techniques (e.g., segmentation, k-means clustering, neural networks, etc.) to identify and locate the outer edge 80 of the disc blade 32 and, in some embodiments, identify and locate the rotational axis 70 of the disc blade 32. In certain embodiments, the controller 74 may employ machine learning techniques to fit a circle and/or arc to the outer edge 80 of the disc blade 32. The controller 74 may be configured to determine multiple estimated radii along the radial axis 134 of the disc blade 32 based on a determined location of the outer edge 80 and, in certain embodiments, a determined location of the rotational axis 70 of the disc blade 32. The controller 74 may be configured to determine the radius of the disc blade 32 based on an aggregation (e.g., average, mean, median, etc.) of the multiple radii estimates.

In certain embodiments, the controller 74 may be configured to receive multiple signals (e.g., data points, point clouds, etc.) from the lidar sensor 130 over a span of time. For example, the lidar sensor 130 may output a first signal (e.g., dataset) at a first time and, after a duration of time, output a second signal (e.g., dataset) at a second time. The controller 74 may be configured to determine a first radius of each monitored disc blade 32 at the first time, and a second radius of each monitored disc blade 32 at the second time. The controller 74 may be configured to determine an amount of wear (e.g., reduction in radius) of each monitored disc blade 32 based on a comparison of the first radius and the second radius. For example, the controller 74 may be configured to determine the amount of wear based on a difference between the first radius and the second radius. In certain embodiments, the controller 74 may be configured to determine the amount of wear of each monitored disc blade 32 individually based on the first signal and the second signal received from the lidar sensor 130.

In certain embodiments, the controller 74 may be configured to determine a rate of wear (e.g., rate of diameter reduction) of the monitored disc blades 32. For example, the controller 74 may receive, in addition to the aforementioned signals, the timestamps when each of the aforementioned signals is received. The controller 74 may be configured to determine the rate of wear based on the aforementioned signals and the timestamps of the aforementioned signals. For example, the controller 74 may be configured to determine the rate of wear by dividing the amount of wear (e.g., determined using the first signal and the second signal received from the lidar sensor 130) by the duration of time between the controller 74 receiving the first signal and the second signal. In certain embodiments, the controller 74 may be configured to determine the rate of wear of each monitored disc blade 32 individually based on the first signal and the second signal received from the lidar sensor 130.

In certain embodiments, the controller 74 may be configured to determine a bulging of one or more disc blades 32 based on signal(s) received from the lidar sensor 130. For example, the controller 74 may employ machine learning techniques (e.g., segmentation, k-means clustering, neural networks, etc.) to identify and locate the outer edge 80 of each disc blade 32 within the field of view and, in some embodiments, identify and locate the rotational axis 70 of the disc blade 32. In certain embodiments, the controller 74 may employ machine learning techniques to fit a circle and/or arc to the outer edge 80 of the disc blade 32. The controller 74 may determine a bulging of the disc blade 32 based on a comparison of multiple radii (e.g., determined at different times). For example, the controller 74 may determine a bulging of the disc blade 32 based on an increase in the multiple radii from a first time to a second time. For example, the controller 74 may determine a bulging of the disc blade 32 based on an increase in the maximum radius of the multiple radii (e.g., semi-major axis) from the first time to the second time. In other embodiments, the controller 74 may be configured to determine a bulging of the disc blade 32 based on a difference between the maximum radius of the multiple radii (e.g., semi-major axis) and a minimum radius of the multiple radii (e.g., semi-minor axis) exceeding a threshold.

In certain embodiments, the controller 74 may be configured to determine a rate of bulging (e.g., rate of deformation) of the monitored disc blades 32. For example, the controller 74 may receive, in addition to the aforementioned signals, the timestamps when each of the aforementioned signals is received. The controller 74 may be configured to determine the rate of bulging based on the aforementioned signals and the timestamps of the aforementioned signals. For example, the controller 74 may be configured to determine the rate of bulging by dividing the amount of bulging (e.g., determined using the first signal and the second signal received from the lidar sensor 130) by the duration of time between the controller 74 receiving the first signal and the second signal. In certain embodiments, the controller 74 may be configured to determine the rate of bulging of each monitored disc blade 32 individually based on the first signal and the second signal received from the lidar sensor 130.

In certain embodiments, the controller 74 may be configured to determine the wear of at least one monitored disc blade 32, the bulging (e.g., deformation) of at least one monitored disc blade 32, or a combination thereof, based on signals (e.g., datasets, point clouds, etc.) received from the lidar sensor 130 at multiple times. Additionally, the controller 74 may be configured to determine the rate of wear of at least one monitored disc blade 32, the rate of bulging of at least one monitored disc blade 32, or a combination thereof, based on the signals and timestamps corresponding to the signals.

In certain embodiments, the controller 74 may be configured to determine the wear of at least one monitored disc blade 32 and concurrently determine the bulging of at least one additional monitored disc blade 32. For example, the controller 74 may determine that a first disc blade 32 is worn (e.g., reduced radius) and concurrently determine that a second disc blade 32 is bulging (e.g., deformed, elongated) based on the same signal (e.g., dataset, point cloud, etc.) from the lidar sensor 130. The controller 74 may be configured to update a status specific to each individual disc blade 32. For example, the controller 74 may update a first status corresponding to the first disc blade 32 and concurrently update a second status corresponding to the second disc blade 32, such that an operator may be notified that the first disc blade 32 is worn and concurrently notified that the second disc blade 32 is bulging.

In certain embodiments, the position (e.g., location of mounting) of the lidar sensor 130 relative to the rotational axis 70 is adjustable. For example, the lidar sensor 130 (e.g., field of view 132 of the lidar sensor 130) may be movable in the longitudinal direction 42 relative to the disc blades 32. The lidar sensor 130 may be configured to be adjusted manually or, in some embodiments, via an actuator. An adjustable lidar sensor 130 may enable a user to adjust the size and/or direction of the field of view 132 of the lidar sensor 130 based on one or more factors (e.g., angle of disc blades 32, user preferences, characteristic(s) of the disc blade 32, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for a tillage implement, comprising:
    an emitter configured to direct a beam across a set of disc blades of the tillage implement, wherein an axis of the beam is configured to intersect the set of disc blades at a position, the position radially offset from a rotational axis of the set of disc blades, and the axis is parallel to the rotational axis;
    an additional emitter configured to direct an additional beam across the set of disc blades, wherein an additional axis of the additional beam is configured to intersect the set of disc blades at an additional position, the additional position radially offset from the rotational axis, the position and the additional position are radially offset from one another, and the additional axis is parallel to the rotational axis;
    a sensor configured to receive the beam associated with the emitter;
    an additional sensor configured to receive the additional beam associated with the additional emitter; and
    a controller, comprising:
        a memory configured to store instructions; and
        one or more processors, wherein the controller is configured to:
            receive a signal from the sensor indicative of detection of the beam;
            receive an additional signal from the additional sensor indicative of detection of the additional beam; and
            determine a wear status of the set of disc blades based on the signal and the additional signal.

2. The control system of claim 1, wherein the controller is configured to determine an amount of wear of the set of disc blades based on the signal and the additional signal.

3. The control system of claim 1, wherein the emitter and the sensor are configured to be movable along a radial direction of the set of disc blades.

4. The control system of claim 1, wherein the controller is configured to determine the wear status of the set of disc blades based on the sensor continuously detecting the beam, wherein the set of blades comprises a notched blade.

5. The control system of claim 1, wherein the emitter and the additional emitter are disposed on a first axial side of the set of disc blades, the sensor and the additional sensor are disposed on a second axial side of the set of disc blades, and the first axial side and the second axial side are different from one another.

6. The control system of claim 5, wherein determining the wear status of the set of disc blades based on the signal and the additional signal comprises:
    identifying the beam becoming unobstructed by the set of disc blades;
    identifying the additional beam becoming unobstructed by the set of disc blades; or
    a combination thereof.

* * * * *